United States Patent [19]

Kubo

[11] Patent Number: 5,726,819
[45] Date of Patent: Mar. 10, 1998

[54] APPARATUS FOR ERASING A RECORDING MEDIUM

[75] Inventor: Ryoji Kubo, Tokyo, Japan

[73] Assignee: Canon Kabushiki Kaisha, Tokyo, Japan

[21] Appl. No.: 279,869

[22] Filed: Jul. 26, 1994

Related U.S. Application Data

[63] Continuation of Ser. No. 766,266, Sep. 27, 1991, abandoned.

[30] Foreign Application Priority Data

| Oct. 2, 1990 | [JP] | Japan | 2-264438 |
| Oct. 2, 1990 | [JP] | Japan | 2-264439 |
| Oct. 2, 1990 | [JP] | Japan | 2-264441 |

[51] Int. Cl.$^6$ ......................... G11B 5/02
[52] U.S. Cl. .................. 360/57; 358/906; 358/909.1
[58] Field of Search ................. 360/57, 9.1, 55, 360/60, 35.1; 358/310, 342, 906, 909.1; 369/32, 13, 14, 286, 288; 365/230.03, 185.29; 386/118, 120; 396/161

[56] References Cited

U.S. PATENT DOCUMENTS 4,366,501  12/1982  Tsunekawa et al. ............ 360/91.1 X

FOREIGN PATENT DOCUMENTS 0271869  6/1988  European Pat. Off. .

OTHER PUBLICATIONS

Patent Abstracts of Japan, vol. 14, No. 383 (E–966), Aug. 17, 1990.

Patent Abstracts of Japan, vol. 14, No. 153 (P–1026), Mar. 23, 1990.

Patent Abstracts of Japan, vol. 14, No. 279 (P–1062), Jun. 15, 1990.

*Primary Examiner*—Ali Neyzari
*Attorney, Agent, or Firm*—Fitzpatrick, Cella, Harper & Scinto

[57] ABSTRACT

An erasing apparatus that includes a supplying device for supplying power to the apparatus, an erasing device for collectively erasing information recorded on a medium, and a control device for continuing the supply of power from the supplying device during the erasing by the erasing device.

9 Claims, 13 Drawing Sheets

| FIG. 4A |
|---|
| FIG. 4B |

FIG. 5
(1) NORMAL TAKING MODE (NUMBER DENOTES TRACK)
S 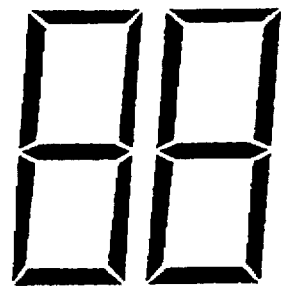
(2) CONTINUOUS TAKING MODE (NUMBER DENOTES TRACK)
C 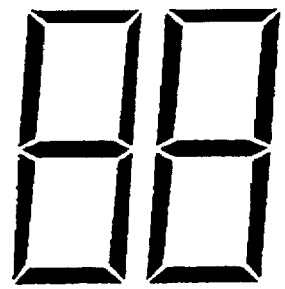
(3) SELFTIMER TAKING MODE (NUMBER DENOTES TRACK)
 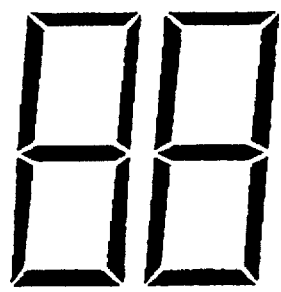

FIG. 6

(1) INTERVAL TAKING MODE

INT.

0 M (2) DURING INTERVAL TAKING (NUMBER DENOTES TRACK)

\\\///
INT.

88

(3) INTERVAL TAKING PERIOD AT INTERVAL TAKING OPERATION
(NUMBERS 1~99 DENOTE INTERVAL TAKING PERIODS)

\\\///
INT.

88 M

FIG. 7
(1) NORMAL REPRODUCING MODE
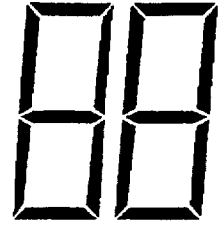
(2) INTERVAL REPRODUCING MODE
 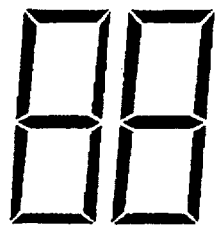
(3) ERASING MODE
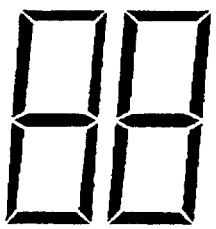
(4) ALL ERASING MODE
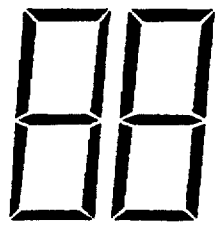

FIG. 8
(1)
(2)
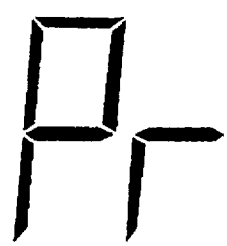
(3)
(4)
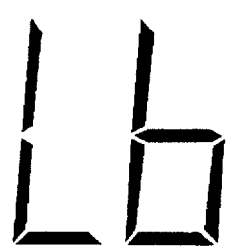

FIG. 9
(1) NUMBER DENOTES YEARS 0~99
(2) NUMBER DENOTES DAYS 0 ~31
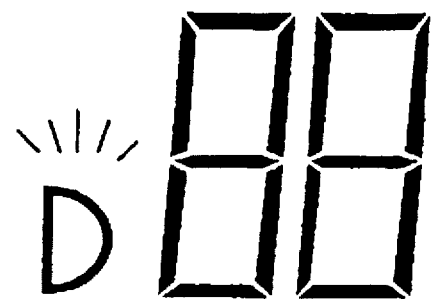

ID
APPARATUS FOR ERASING A RECORDING MEDIUM

This application is a continuation of application Ser. No. 07/766,266 filed Sep. 27, 1991, now abandoned.

BACKGROUND OF THE INVENTION

1. Field of the Invention

The present invention relates to an erasing apparatus, and more particularly to one for erasing an image recorded on a recording medium such as a magnetic disk or a solid-state memory.

2. Related Background Art

There is already commercialized an electronic still camera, employing a magnetic disk of 2 inches in diameter, called a still video floppy disk, as an image recording medium. The recording format of the still video floppy disk is defined by the still video committee. The still video floppy disk has 50 recording an tracks, from the outermost 1st track to the innermost 50th track, each capable of recording image signal of a field. Image recording of a frame can be achieved by two adjacent tracks. Also, the recording format is defined for the ID information associated with the recorded still image, such as date, time, track number, field/frame identification information and user code.

Also, there is known an electronic still camera capable of digital recording of an image utilizing a solid-state memory such as a semiconductor memory, as the recording medium.

For erasing the records on all the tracks of such still video floppy disk, the conventional apparatus is equipped with an exclusive switch for all-track erasure, and the all-track erasing operation is started and stopped by such an exclusive switch.

However, such structure increases the number of switches to be manipulated, and involves the danger of erroneous manipulation.

Also, if the operation is cancelled in the course of the all-track erasing operation, then the all-track erasing mode is cancelled after the erasing operation of a track currently under erasure is completed. Thus, as the erasing mode is not immediately cancelled by the actuation of the switch, the operator feels uneasiness that the actuation of cancelling switch may not have been accepted.

Furthermore, in the conventional erasing apparatus, the power supply therefor is continued even after the erasure of all the tracks, and involves unnecessary power consumption such as the motor for rotating the recording medium still being in rotation. Also, in case where the recording medium is composed of a semiconductor memory, the power consumption is wasted by continuation of power supply to said semiconductor memory.

Furthermore, the conventional electronic still camera is often provided, in addition to the erasing mode for erasing a designated track of the recording medium, with an all-track erasing mode for erasing all the tracks, and an exclusive switch is provided for effecting and cancelling such all-track erasure.

However, such a conventional structure increases the number of switches to be manipulated, and also involves the danger of an erroneous manipulation.

SUMMARY OF THE INVENTION

An object of the present invention is to provide an erasing apparatus capable of collectively or individually resolving the drawbacks mentioned above.

Another object of the present invention is to provide an erasing apparatus with improved operability.

Still another object of the present invention is to provide an erasing apparatus with reduced electric power consumption.

Still another object of the present invention is to provide an erasing apparatus capable of preventing erroneous operations.

The foregoing objects can be attained, according to a preferred embodiment of the present invention, by an image record/reproducing apparatus provided with an all-track erasing mode for erasing all the records on a recording medium, in which said erasure of all the records is achieved by simultaneous actuations of plural operation members to be used in the recording mode, whereby the erroneous execution of the all-record erasing mode can be prevented and the number of operation members can be reduced.

Also disclosed is an apparatus equipped with two display members, both of which are in a display state during the all-record erasing mode, but one of which is shifted to a non-display state in response to the cancellation of the all-record erasing mode and the other of which is also shifted to a non-display state at the completion of the erasing operation currently in progress at the cancellation of the all-record erasing mode, whereby the acceptance of cancellation of the all-record erasing mode can be confirmed even in the course of an erasing operation.

Still other objects of the present invention, and the advantages thereof, will become fully apparent from the following description of embodiments, which is to be taken in conjunction with the attached drawings.

BRIEF DESCRIPTION OF THE DRAWINGS

FIGS. 5, 6, 7, 8 and 9 are views showing examples of display by the display unit 36;

DETAILED DESCRIPTION OF THE PREFERRED EMBODIMENTS

Now the present invention will be clarified in detail by embodiments shown in the attached drawings.

Figure 1:
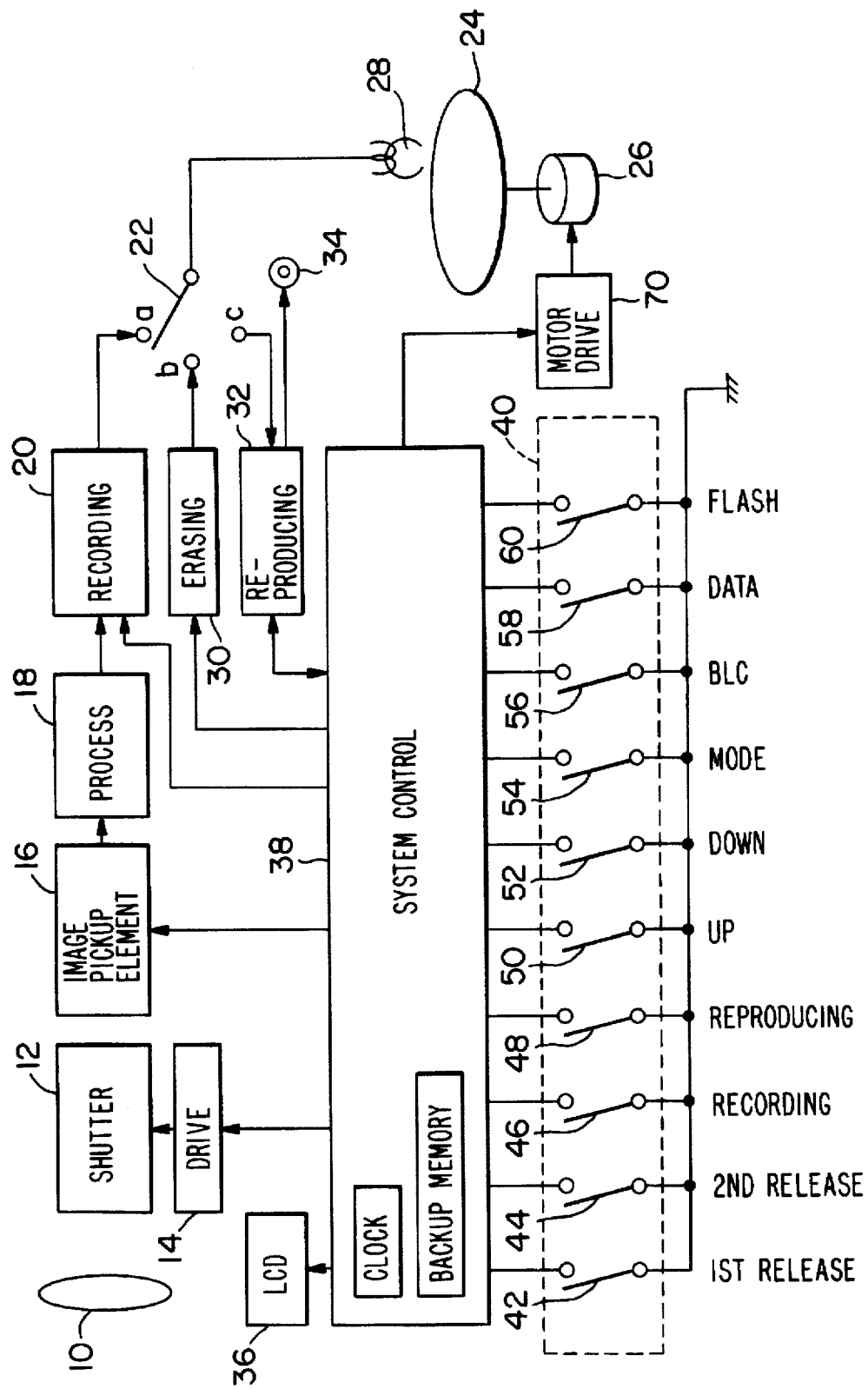
FIG. 1 is a block diagram of an embodiment of the present invention.

FIG. 1 is a block diagram of an embodiment of the present invention, wherein shown are a phototaking lens 10; a mechanical shutter 12; a driving circuit 14 for the shutter 12; an image pickup device 16; a process circuit 18 for forming a luminance signal and color difference signals from the output of the image pickup device 16; a recording circuit 20 for applying recording processes such as modulation on the luminance and color difference signals released from the process circuit 18; a selector switch 22 for selecting recording, erasure or reproduction; a video floppy disk 24 constituting the recording medium; a motor 26 for rotating the floppy disk 24; a magnetic head 28; an erasing circuit 30 for generating an erasing signal; a reproducing circuit 32 for applying reproduction process such as demodulation on the signal reproduced by the magnetic head 28 thereby generating a video signal; and a video output terminal 34.

There are further shown a liquid crystal display device 36 for displaying the status of the system and various data; a system control circuit 38 for controlling the entire system; and a group of switches 40 for entering instructions to the control circuit 38. In the group of switches there are provided a first release switch 42 to be closed by a first stroke of the shutter releasing operation, thereby initiating preparation for phototaking; a second release switch 44 to be closed by a second stroke, succeeding to the first stroke, of the shutter releasing operation, thereby initiating the phototaking operation; a recording switch 46; a reproducing switch 48; an up switch 50 for instructing a track upshift; a down switch 52 for instructing a track downshift; a mode switch 54 for switching the display mode of the display unit 36 and the set mode; a BLC switch 56 for back lighting correction; a data switch 58; and a flash switch 60 for controlling a flash unit. The detailed functions and additional functions of the said switches will be explained later.

A motor driving circuit 70, for driving the motor 26, stops said motor 26 in the shut-off state.

The system control circuit 38 is provided therein with a clock circuit and a back-up memory, and there are also provided a battery for the back-up memory, and a main battery for powering various circuits other than the control circuit 38.

Figure 11:
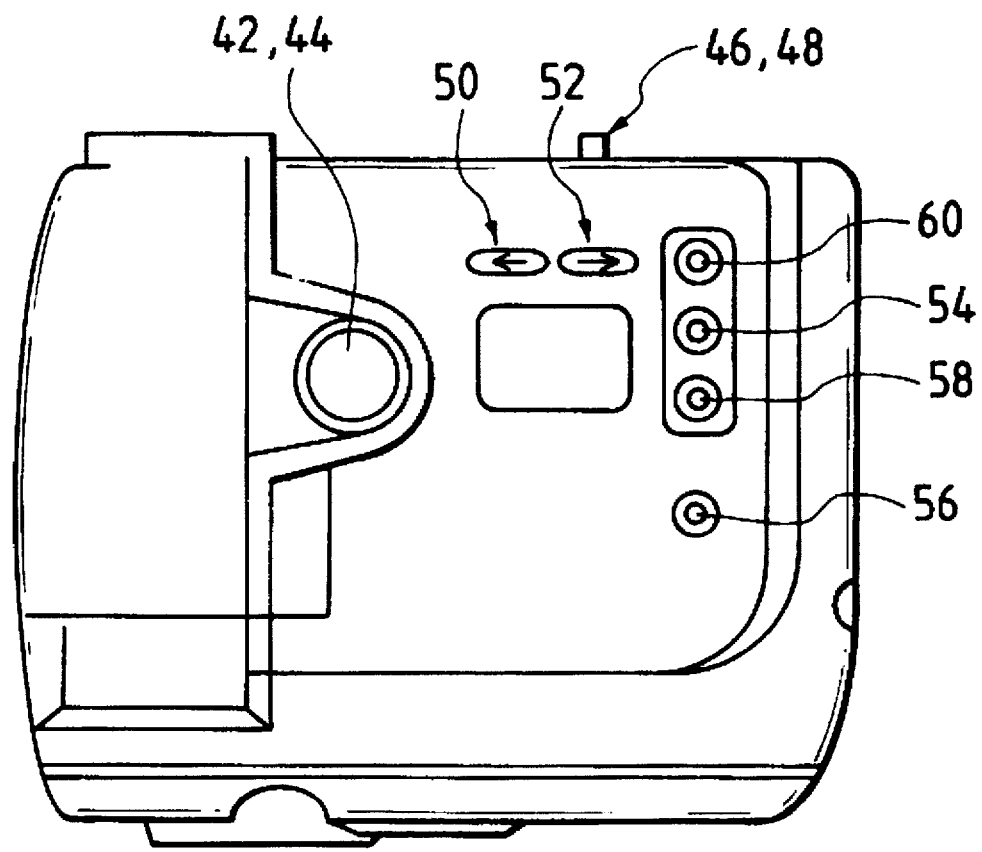
FIG. 11 is an external view of the apparatus.

FIG. 11 is an external view of the apparatus of the embodiment, wherein numbers correspond to those in FIG. 1.

Figure 2:
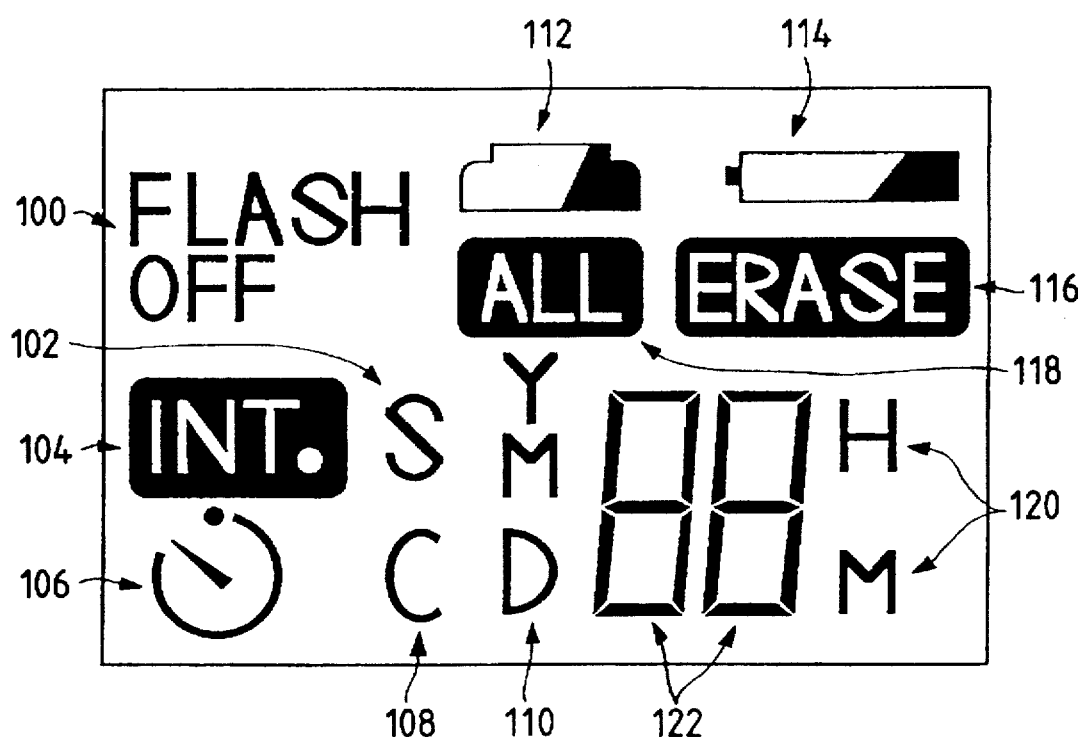
FIG. 2 is a view showing the contents of display of a display unit 36.

FIG. 2 shows display elements in the liquid crystal display unit 36. An element 100 is displayed when the light emission of the flash unit is forcedly inhibited, and is turned off when the light emission is automatically controlled according to the intensity of external illumination. An element 102 is displayed in the normal phototaking mode. An element 104 is displayed in the interval phototaking mode or in the interval reproduction mode. An element 106 is displayed in the self-timer phototaking mode. An element 108 is displayed in the continuous phototaking mode. Elements 110 are displayed for distinguishing date, wherein Y, M and D respectively stand for year, month and day. An element 112 flashes when the battery for the clock needs replacement. An element 114 flashes when the main battery needs replacement. An element 116 is displayed in the erasing mode. An element 118 is displayed together with the element 116 in the all-track erasing mode. Elements 120 are displayed for distinguishing time, wherein H and M respectively stand for hour and minute. Elements 122 display characters and numerals, for example for the date, time or track number.

The circuit shown in FIG. 1 functions in the following manner. In the recording operation, the shutter 12 is activated by the shutter releasing operation, and the electrical signal obtained by the image pickup device 16 is converted by the process circuit 18 into luminance and color difference signals. The recording circuit 20 applies a recording process such as frequency modulation on the output signals of the process circuit 18, and the obtained signal is supplied through the switch 22 to the magnetic head 28 and recorded on the magnetic disk 24. In the reproducing operation, the output of the magnetic head 28 is supplied through the switch 22 to the reproduction circuit 32, which effects a reproduction process such as demodulation and releases the reproduced image signal to the output terminal 34.

Figure 3:
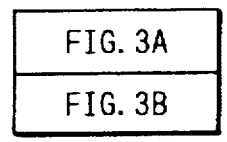
FIG. 3 consisting of FIGS. 3A–3B are a flow chart of an operational sequence for recording and display.

Now reference is made to FIG. 3 for explaining the operations in the recording and the display operations related thereto. The recording mode is assumed by the actuation of the recording switch 46, whereupon the display unit 36 displays a symbol "S" 102 indicating the normal phototaking mode (S100) as shown in FIG. 5(1), and also displays a track number by the elements 122. When the switch 44 is turned on (S104) in this state, the image is recorded on the magnetic disk 24 as explained above (S1). If the switch 44 remains turned on after recording, the recorded image is reproduced as explained above (S2, S3). In this reproduction, the reproduced video signal, overlapped with the track number of the track recorded in the step S1 is released from the output terminal 34. When the switch 44 is turned off, the magnetic head 28 moves to a next track (S4), and the display unit 36 displays the track number after shifting.

When the mode switch 54 is actuated in this state, the operating mode is shifted from the normal phototaking mode to the continuous phototaking mode (S101), whereupon the display unit 36 displays a symbol "C" 108 indicating the continuous phototaking mode as shown in FIG. 5(2), and also displays a track number for recording, by the elements 122. When the switch 44 is turned on in this state (S105), the obtained images are continuously recorded on the magnetic disk 24 while the switch 44 is turned on (S5, S6, S7).

If the mode switch 54 is actuated again, the operating mode is shifted from the continuous phototaking mode to the self-timer phototaking mode (S101), whereupon the display unit 36 displays a timer symbol 106, indicating the self-timer phototaking mode, as shown in FIG. 5(3), and also displays a track number for recording, by the elements 122. If the switch 44 is turned on in this state (S106), the motor 26 is activated and a light-emitting device for self-timer (not shown) flashes with a frequency of 8 Hz for 2 seconds (S8). Then recording is executed (S9) and the magnetic head is shifted to a next track (S10).

When the mode switch 54 is actuated again, it assumed to be the interval phototaking mode (S103), whereupon the display unit 36 displays a symbol "INT" 104 indicating the interval phototaking mode, as shown in FIG. 6(1), and also displays "$0_M$", indicating that the interval of phototakings is not set, by means of the elements 122 and 120. Then said interval is set within a range of 1–99 minutes, by means of the up switch 50 and the down switch 52. When the switch 44 is subsequently turned on, the recording and display operations are conducted as explained above, then the magnetic head 28 is shifted to a next recording track, and the display unit 36 flashes the symbol "INT" 104 as shown in FIG. 6(2). Thereafter checked is an interval timer (S11), and the motor 26 is activated 2 seconds before the preset interval. At the same time the light-emitting device (not shown) for self-timer flashes at a frequency of 8 Hz for 2 seconds, and the recording (S12) and the track shifting (S13) are conducted. During the interval phototaking mode, the steps S11, S12 and S13 are repeated.

If the data switch 58 is actuated during the flashing state of the "INT" symbol 104 in the interval phototaking mode, the display unit 36 displays the interval of phototaking, as shown in FIG. 6 (3).

Figure 10:
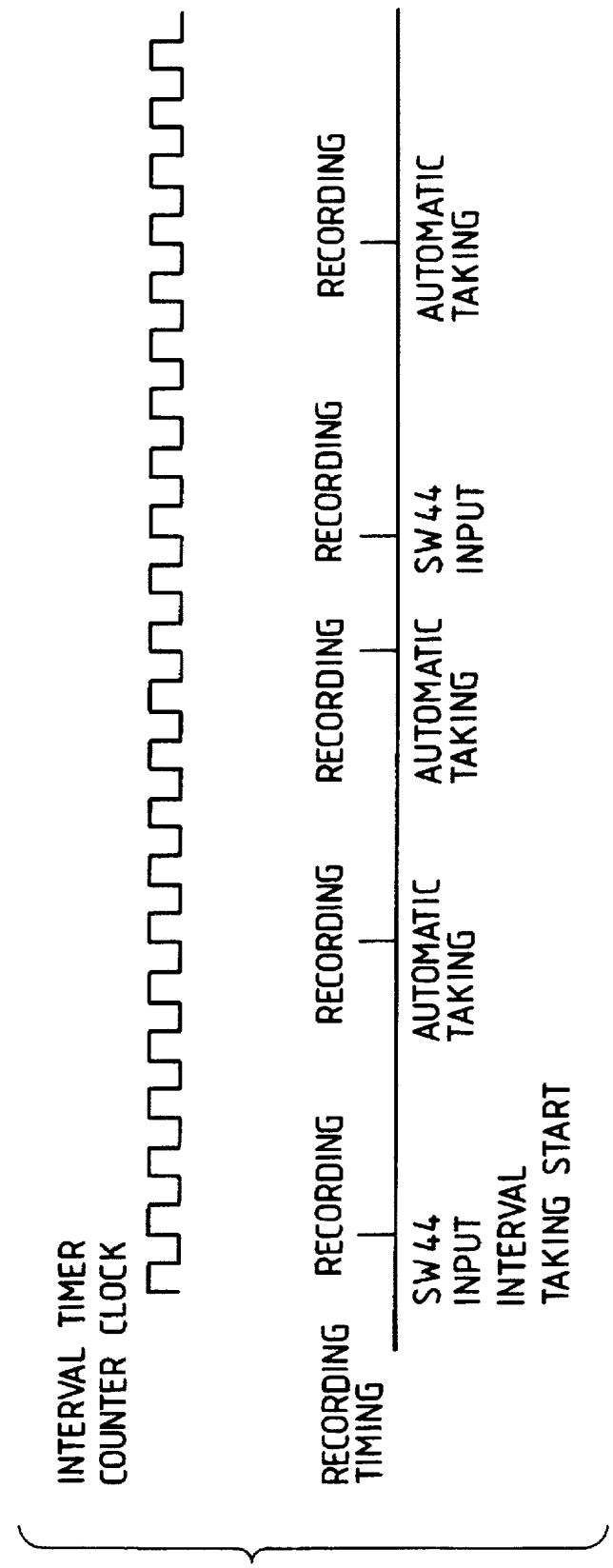
FIG. 10 is a timing chart of an interval phototaking mode.

Also, if the switch 44 is turned on in the course of the interval phototaking mode (S14), the above-explained recording and display are executed (S15, S16), and the measurement of interval time, which has been continued up to this point, is reset (S17) and is started anew. FIG. 10 is a timing chart in case the switch 44 is turned on after two automatic phototaking operations in the interval phototaking mode.

The interval phototaking mode can be cancelled by selecting the normal phototaking mode with the mode switch 54, or by adopting the normal phototaking mode by the actuation of the recording switch 46 after locking or image reproduction, or by adopting the normal phototaking mode by removing and re-loading the magnetic disk. In case the switch 44 is turned on while the interval time is not yet determined (display of "$0_M$"), the recording and display are conducted as explained above, and there is assumed the normal phototaking mode, whereupon the symbol "S" 102 is displayed.

In any of the foregoing modes, if the BLC switch 56 is actuated simultaneously with the switch 44, the obtained image is recorded with correction for back lighting. Also, if the flash switch 60 is turned on, the flash emits light during the phototaking operation.

Figures 4, 4A:
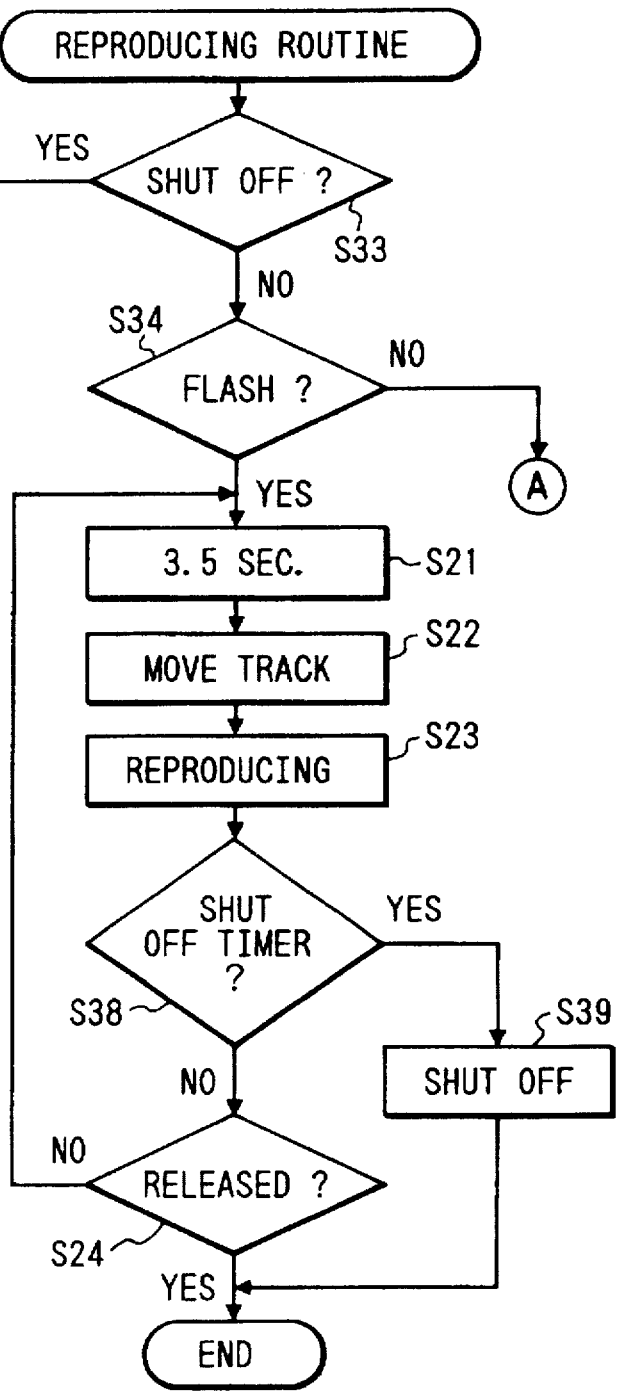
FIG. 4 consisting of FIGS. 4A–4B are a flow chart of an operational sequence for reproduction and erasure.
Figure 4B:
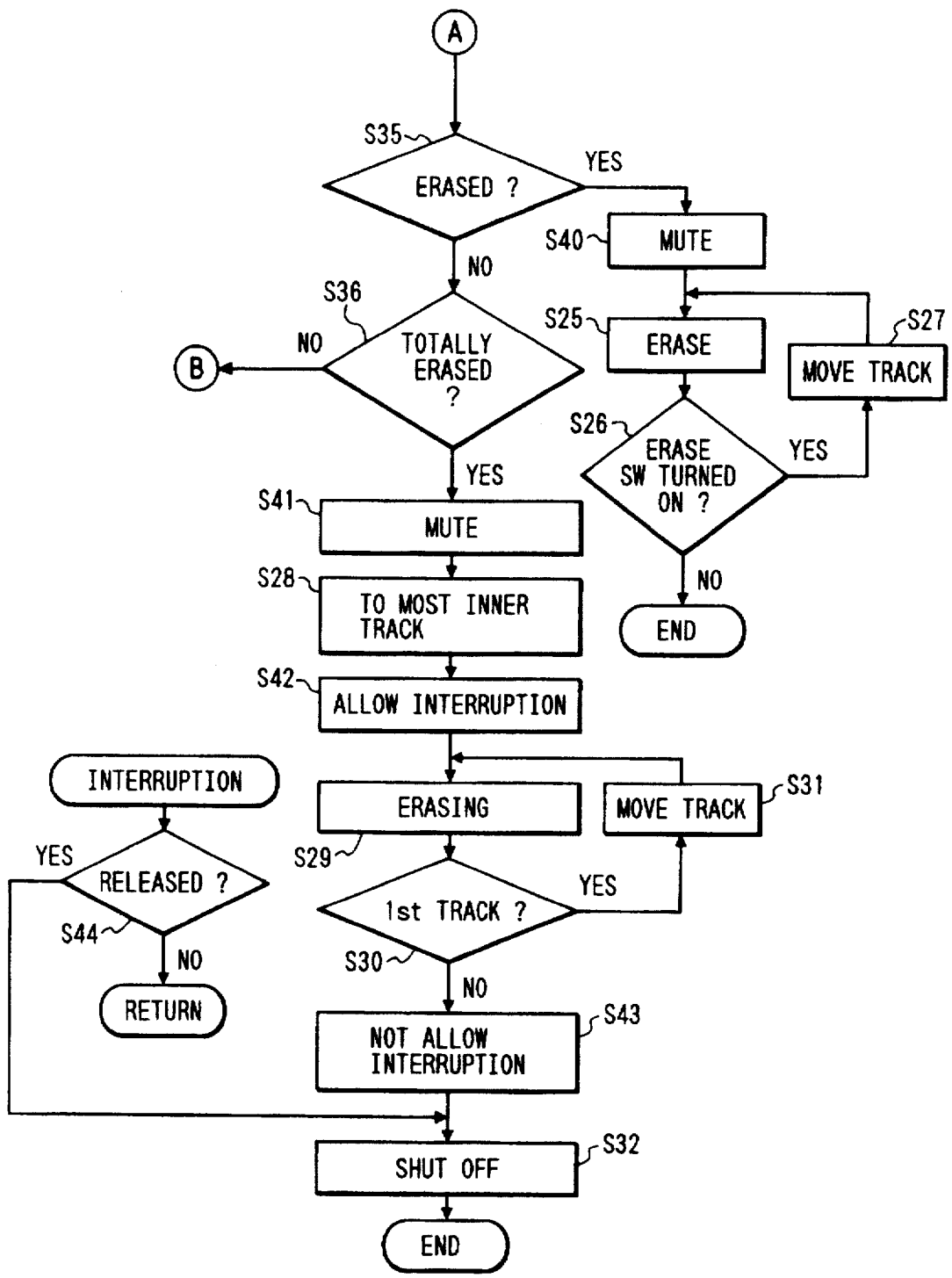

Now reference is made to FIG. 4 for explaining the operations and displays in the reproducing and erasing operations. In response to the actuation of the reproducing switch 48, there is assumed the reproduction mode, in which reproduced is an image which has been recorded immediately before or which was recorded in a designated track (S20). Also recorded ID data, such as of data and time, are released from the output terminal 34 in the the form of a character signal, overlapped with the reproduced video signal, in response to the actuation of the data switch 58. Thus the track number, data and time are displayed and erased cyclically in response to the actuations of the data switch 58. Also the reproduced track can be varied by the up switch 50 and the down switch 52.

If the track to be reproduced is not recorded, a mute signal is released from the output terminal 34. In such case the ID data are not reproduced nor displayed. Also the display of ID data does not change by the actuation of the data switch 58.

If the flash switch 60 is actuated during the reproducing operation (S34), there is assumed the interval reproducing mode, whereupon the display unit 36 displays a symbol "INT" 104 indicating the interval reproduction mode, as shown in FIG. 7(2), and also displays the track number in reproduction, by the segments 122. In this mode, after reproduction for 3.5 seconds (S21), the magnetic head is shifted to a next upper recorded track (S22) and said track is reproduced (S23). The steps S21, S22 and S23 are cyclically repeated until the interval reproduction ceases. If there are no upper recorded tracks, the recorded tracks are reproduced in succession from the first track. Consequently, if there is only one recorded track, the track alone is reproduced. Also, if there is no recorded track, the display of the "INT" symbol 104 is erased and the interval reproduction mode is cancelled.

The interval reproduction mode can be cancelled either by the actuation of the flash switch 60, or by the turning-on of the switch 42, or by the actuation of the reproduction switch 48 again after locking or shifting to the recording mode, or by the actuation of the mode switch 54.

If none of the switches 42–60 is actuated, in the course of reproducing modes, including the interval reproducing mode, for a period of 3 minutes (in case main power is supplied by battery) or 6 minutes (in case main power is supplied by AC lines) (S38), the power supply is automatically shut off and the reproducing operation is terminated (S39). In the present embodiment, a period of 3 minutes is selected as a time enough for reproducing all the tracks on the disk 24. However such period is not limitative, and the control circuit 38 may terminate the reproducing operation upon identifying the completion of interval reproduction of all the tracks. In the following, such state is called "shut-off". In this state, the display unit 36 displays the track number by the segments 122 as shown in FIG. 7(1), and the interval reproducing mode is cancelled.

In the shut-off state, the reproduction may be re-started by turning on the switch 42 (S37), or by actuating the reproduction switch 48 again after locking or shifting to the recording mode.

There is not provided an exclusive switch for assuming the erasing mode. The erasing mode is assumed, instead, by simultaneously actuating a plurality of switches used only in the recording mode, in the course of the reproduction mode. More specifically, by simultaneous actuating the switches 42, 44 and the mode switch 54 in the course of the reproduction operation (S35), the reproduced image is muted (S40) and the track under reproduction is erased (S25). If the switches continue to be actuated (S26), the magnetic head 28 is shifted to a next inner track (S27) and said track is erased (S25). During these operations, the display unit 36 provides a display as shown in FIG. 7(3) when the mode switch 54 is actuated, and the muted reproduced image is in succession released from the terminal 34 and displayed on a monitor (not shown).

Also in the present embodiment, the all-track erasing mode is assumed by the simultaneous actuation of the switches 42, 44, mode switch 54 and BLC switch 56 (S36). Thus, after the reproduced image is muted (S41), the magnetic head 28 is shifted to the innermost 50th track (S28), and the 50th to 1st tracks are erased in succession (S29, S30, S31). After the erasure to the 1st track, the power supply is turned off to enter the shut-off state (S32). After the switches 42, 44, mode switch 54 and BLC switch 56 are once simultaneously actuated, they may be released. The display unit 36 provides a display as shown in FIG. 7(4) when the switches are simultaneously actuated.

The all-track erasing mode can be cancelled by the actuation of the switch 42 (S44) between the steps S42 and S43, or by the actuation of the reproduction switch 48 again after locking or shifting to the recording mode. When the switch 42 is actuated in the course of erasure of a track, the display of the "ALL" symbol 118 is erased to reach a display state shown in FIG. 7(3). It can thus be identified that the all-track erasing mode is cancelled. After the completion of erasure of the track currently under erasure, the display unit 36 provides a display shown in FIG. 7(1), and the muted reproduced image continues to be released from the terminal 34 and displayed on the monitor (not shown). Also if the switch 42 is actuated during the shift between the tracks, the display unit 36 immediately provides the display shown in FIG. 7(1).

A recording-proof measure may be applied to the magnetic disk 24. If the above-explained erasing operation is conducted in such a case, then the display unit 36 provides a display as shown in FIG. 8(1) or (2), and the erasure is not executed.

Also, when the main power supply voltage is reduced to a predetermined value, the battery symbol 114, flashes as a warning signal, and the all-track erasing operation is inhibited at the predetermined voltage. Thus, if the all-track erasing operation is instructed at the predetermined voltage or lower, then the display unit 36 provides a display as shown in FIG. 8(3). However, if the predetermined voltage is reached in the course of the all-track erasing operation, the erasure is continued.

When the main power supply voltage is further reduced to another predetermined value, there are inhibited the one-track erasing operation and the continuous erasing operation. In response to an erasing instruction, the display unit 36 provides a display shown in FIG. 8(4).

In the following there will be explained clock setting for ID data recording. When the data switch 58 is actuated at the actuation of the recording switch 48 (except in the interval recording operation), or at the actuation of the reproducing switch 48 while the magnetic disk 24 is unloaded, the display unit 36 displays a symbol "Y" 110, indicating year, and a corresponding number by the segments 122. By repeated actuations of the data switch 58, the display cyclically changes in the order of year, month, day, hour, minute and normal display. The current date and time can be confirmed in this manner. The displayed number can be varied by the up switch 50 and the down switch 52, and one of the symbols Y, M, D, H and M flashes as shown in FIG. 9(2). The normal phototaking mode is assumed when the above-explained operation is conducted during the display of the internal time (display of set interval time or unset state of interval time).

If none of the switches is operated for about 1 minute during the display of date and time, the display is switched to the normal state. Also, the normal display is assumed in response to the voltage drop of the main power supply, actuation of the recording switch 46 or reproducing switch 48, or loading or unloading of the magnetic disk 24.

The present embodiment employs the still video floppy disk as the recording medium, but there may be employed a tape-shaped medium, an optical recording medium, or a solid-state memory such as a semiconductor memory, as the recording medium.

As will be easily understood from the foregoing description, the present embodiment can prevent erroneous execution of the all-track erasing mode, since the mode is executed by simultaneous actuation of a plurality of operation members which are used in the recording mode. Also the number of operation members, such as switches, can be reduced since such members are used for a plurality of purposes. Also, the use of two display members in the erasing operation allows confirmation that a cancelling operation for the all-record erasing mode is accepted, even if the cancelling operation is conducted in the course of erasure of a track.

Also, the present embodiment can avoid unnecessary electric power consumption, since the power supply is automatically shut off after the erasure of all the tracks.

Furthermore, the present embodiment ensures correct timing for terminating the erasure, as the all-track erasing mode can be cancelled with a simple operation. Also the cancellation, being achievable with recording switch, does not require additional switches, thus avoiding increase in cost.

What is claimed is:

1. An erasing apparatus comprising:
   supplying means for supplying power to said apparatus;
   erasing means for collectively erasing information recorded on a medium;
   detecting means for detecting a completion of the collective erasing;
   control means for controlling said supplying means to continue the supply of power during the erasing by said erasing means, wherein said control means controls the supply of power in response to a detection output of said detecting means;
   first manipulating means; second manipulating means which is distinct from said first manipulating means; and
   instructing means for providing an instruction to cause the performance of the collective erasing on the condition that said first and second manipulating means are both manipulated.

2. An apparatus according to claim 1, wherein the medium comprises a disc.

3. An apparatus according to claim 1, further comprising display means for displaying information representing that said erasing apparatus is being subjected to the collective erasing operation.

4. Erasing apparatus comprising:
   supplying means for supplying power to said apparatus;
   erasing means for collectively erasing image information recorded on a medium;
   setting means for setting the collective erasing by said erasing means, said setting means including a first manipulating section, a second manipulating section, distinct from said first manipulating section, and means for instructing the performance of the collective erasing on the condition that the first and second manipulating sections are both manipulated;
   first control means operating in a first mode for controlling said erasing means to erase a frame of the image information recorded on the medium, and operating in a second mode for controlling said erasing means to collectively erase the image information recorded on the medium; and
   second control means for controlling said supplying means to continue the supply of power during the erasing by said erasing means, wherein said second control means does not allow an interruption of the supply of power until the completion of the collective erasing by said erasing means.

5. An apparatus according to claim 4, wherein the medium comprises a disc.

6. An apparatus according to claim 4, further comprising a manipulating section for switching said apparatus between the first and second modes according to a manual manipulation of said manipulating section.

7. An apparatus according to claim 4, further comprising display means for displaying information representing that said erasing apparatus is being subjected to the collective erasing operation.

8. An apparatus according to claim 4, wherein said image information comprises still image information.

9. An apparatus according to claim 4, further comprising setting means for instructing a stopping of the erasing operation by said erasing means when said apparatus operates in the second mode.

* * * * *

UNITED STATES PATENT AND TRADEMARK OFFICE
CERTIFICATE OF CORRECTION

PATENT NO. : 5,726,819

DATED : March 10, 1998

INVENTOR(S): RYOJI KUBO

It is certified that error appears in the above-identified patent and that said Letters Patent is hereby corrected as shown below:

COLUMN 1,
Line 19, "an tracks," should read --tracks,--;
Line 20, "image" should read --an image--; and
Line 49, "in case" should read --in the case--.

COLUMN 3,
Line 20, "said" should be deleted.

COLUMN 5,
Line 33, "not' should read --neither--.

COLUMN 6,
Line 13, "simultaneous" should read --simultaneously--;
Line 58, "114," should read --114--; and
Line 62, "display" should read --display,--.

COLUMN 7,
Line 19, "internal" should read --interval--.

COLUMN 8,
Line 6, "means; second" should read --means; ¶ second--.

UNITED STATES PATENT AND TRADEMARK OFFICE
CERTIFICATE OF CORRECTION

PATENT NO. : 5,726,819

DATED : March 10, 1998

INVENTOR(S) : RYOJI KUBO

Page 2 of 2

Figure 3A:
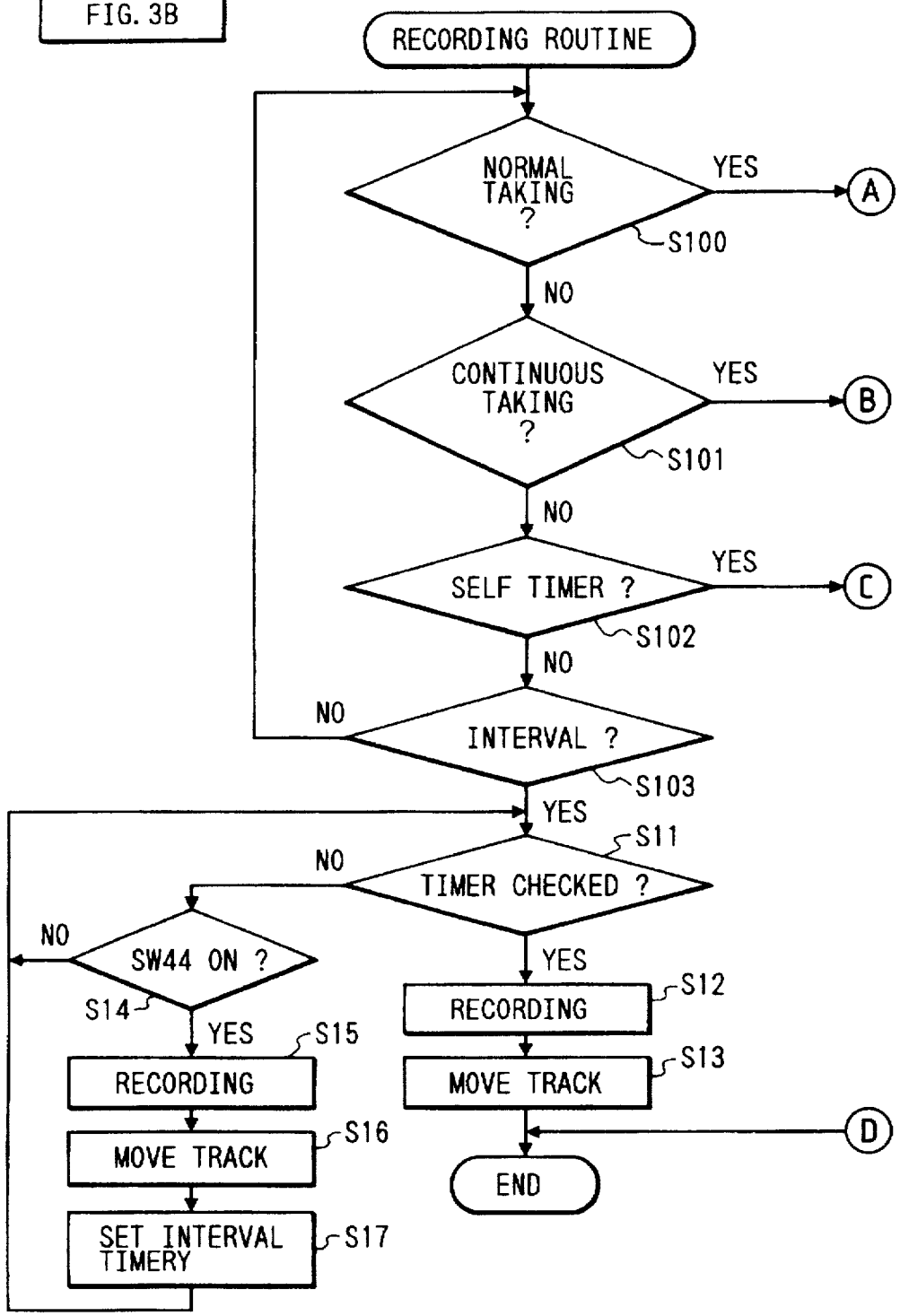
Figure 3B:
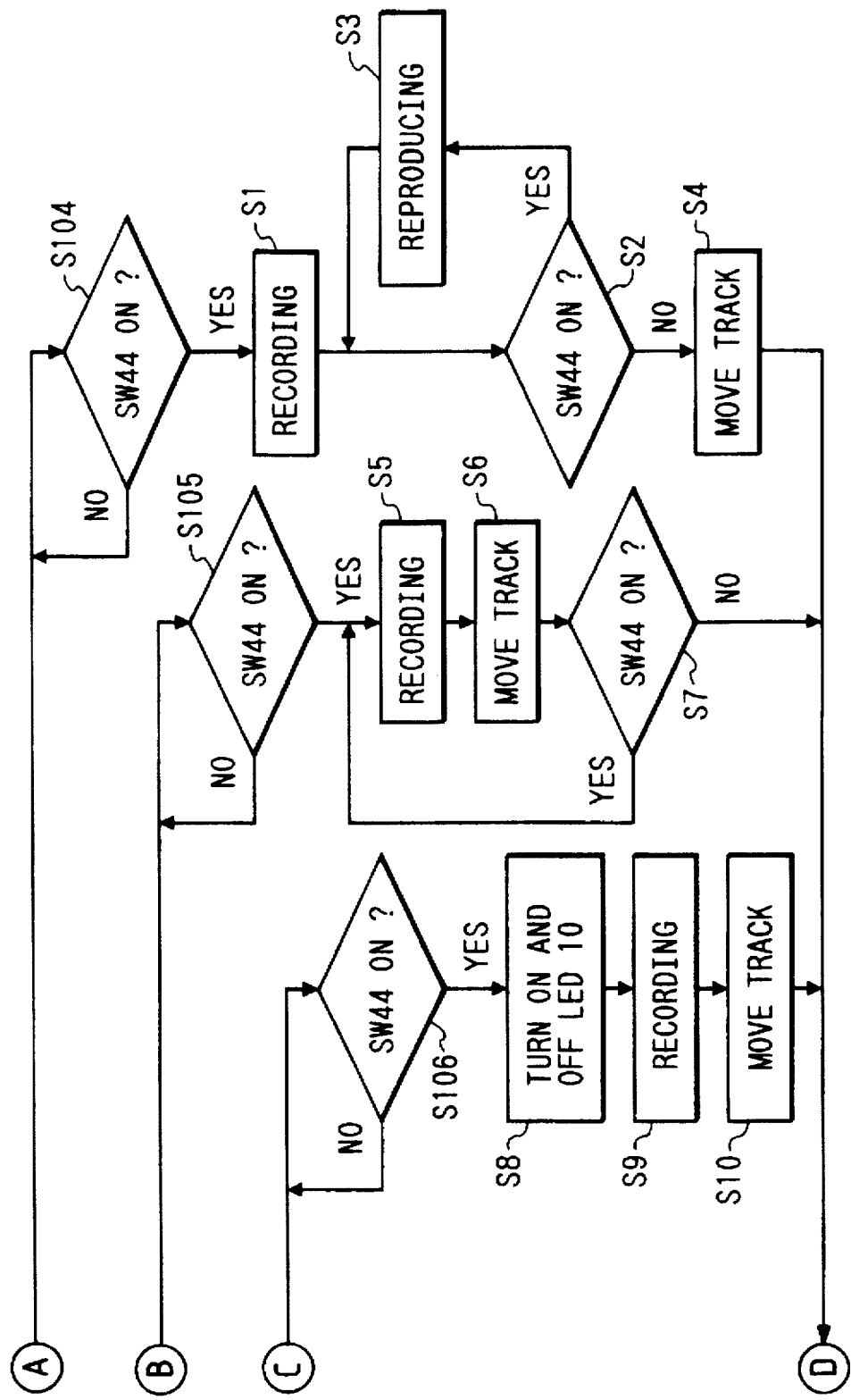

It is certified that error appears in the above-identified patent and that said Letters Patent is hereby corrected as shown below:

<u>FIGURE 3A</u>,
"TIMERY" should read --TIMER--.

Signed and Sealed this

Seventeenth Day of August, 1999

Attest:

Q. TODD DICKINSON

*Attesting Officer*     Acting Commissioner of Patents and Trademarks